Jan. 23, 1962 S. BECKWITH 3,018,018
TANK FOR STORING LOW BOILING TEMPERATURE LIQUIDS
Filed July 1, 1958 3 Sheets-Sheet 1

INVENTOR.
Sterling Beckwith
BY Oorna McDougall,
Williams & Hersh
Attorneys

Jan. 23, 1962 S. BECKWITH 3,018,018
TANK FOR STORING LOW BOILING TEMPERATURE LIQUIDS
Filed July 1, 1958 3 Sheets-Sheet 2

INVENTOR.
Sterling Beckwith
BY
Attorneys

Jan. 23, 1962 S. BECKWITH 3,018,018
TANK FOR STORING LOW BOILING TEMPERATURE LIQUIDS
Filed July 1, 1958 3 Sheets-Sheet 3
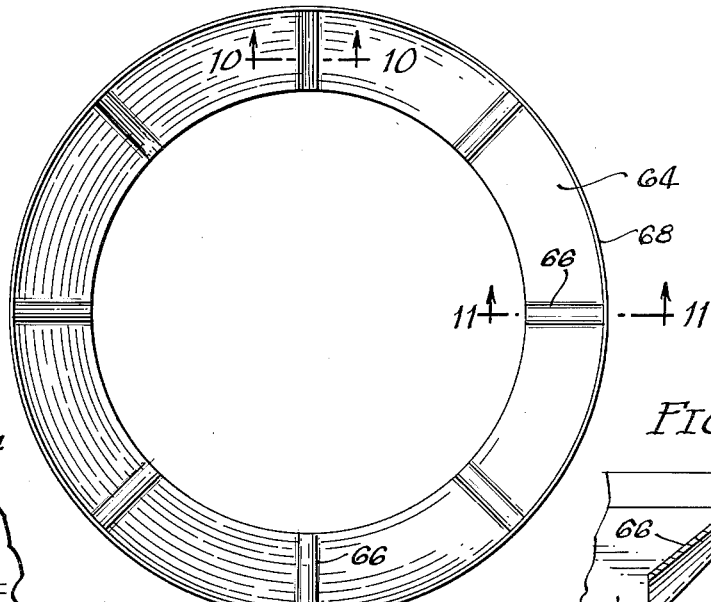
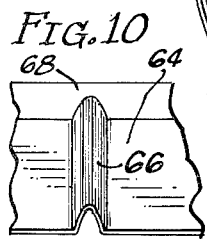
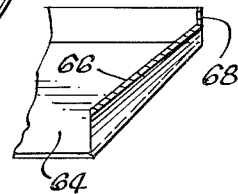
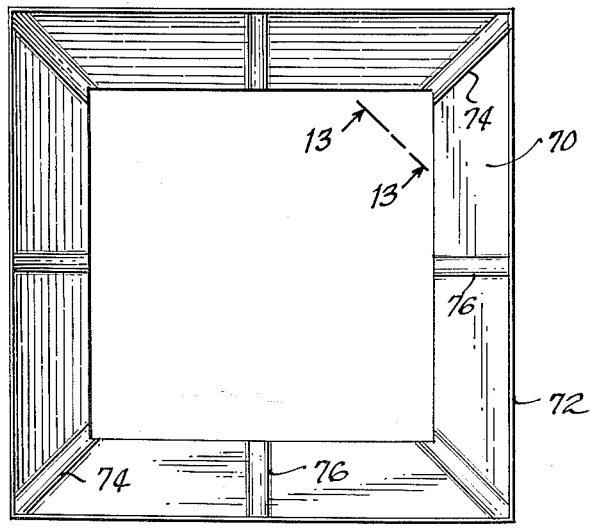
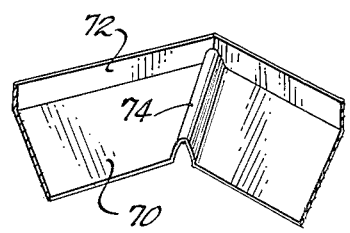
INVENTOR.
Sterling Beckwith
BY
Attorneys United States Patent Office 3,018,018
Patented Jan. 23, 1962

3,018,018
TANK FOR STORING LOW BOILING
TEMPERATURE LIQUIDS
Sterling Beckwith, Lake Forest, Ill., assignor, by mesne assignments, to Conch International Methane Limited, Nassau, Bahamas, a corporation of the Bahamas
Filed July 1, 1958, Ser. No. 745,984
17 Claims. (Cl. 220—63)

This invention relates, as indicated, to an improved tank for storing low boiling temperature liquids, and more particularly, but not by way of limitation, to an improved tank for storing liquefied natural gas. This is a continuation-in-part of applicant's copending application entitled, "Insulating Tank for Cold Boiling Liquids," Serial No. 499,570, filed April 6, 1955, and now Patent No. 2,859,895.

In the above-mentioned application, I have disclosed and claimed a tank structure utilizing a plurality of louvres secured around the inner periphery of the vertical walls of a tank in vertically spaced relation. Each louvre overlaps the louvre below it, so that a series of gas-tight pockets are provided between the louvres, whereby gas evaporated from the liquid will build up a pressure in each pocket and limit the penetration of liquid into the pocket. Thus, the liquid is maintained out of contact with the tank walls to permit the use of an inexpensive material, such as plate steel, for the shell of the tank and minimize evaporation of liquid stored in the tank.

The present invention contemplates an improvement in the above-described tank structure wherein a pan is supported in the lower portion of the tank and cooperates with one or more louvres in the lower portion of the tank to maintain liquid stored in the tank out of direct contact with the bottom wall of the tank. In accordance with the teachings of this invention, two or more of the pans and two or more louvres may be used to assure that any liquid which may inadvertently overflow the upper pan will not come into direct contact with the bottom wall of the tank. This invention also contemplates an arrangement and construction of louvres to provide at least two gas pockets between the liquid stored in the tank and the inner periphery of the tank at any particular level in the tank to assure that the liquid will not come into direct contact with the inner periphery of the tank walls in the event of failure of one or several of the louvres. This invention further contemplates a louvre construction which provides communication between vertically adjacent gas pockets encircling the liquid stored in the tank to distribute the pressure of gas in the pockets and enhance the effect of the gas barrier in preventing direct contact between the liquid and the inner periphery of the tank body. Finally, the present invention contemplates a louvre construction which will have a minimum tendency to rupture or appreciably bend upon the occurrence of substantial temperature changes in the tank, such that thin, light-weight and economical louvres may be used.

An important object of this invention is to provide a tank for storing low boiling temperature liquids utilizing a minimum of insulation materials.

Another object of this invention is to provide a novel tank construction wherein cold liquid stored in the tank will not come into direct contact with the bottom wall of the tank.

Still another object of this invention is to provide a novel pan construction in the lower end portion of a tank used for storing low boiling temperature liquids which will not become damaged or inoperable by substantial temperature changes in the tank.

A further object of this invention is to provide a tank for storing low boiling temperature liquids and utilizing a series of louvres to form gas pockets between the liquid and the inner periphery of the tank body, wherein at least two concentric gas pockets surround liquid stored in the tank at any particular level.

Another object of this invention is to provide a tank for storing low boiling temperature liquids and utilizing a gas barrier between the liquid and the inner periphery of the tank wall, wherein an increase in pressure in a lower portion of the gas barrier will be transmitted to an upper portion of the gas barrier and distribute the back pressure on liquid stored in the tank.

A further object of this invention is to provide a novel louvre construction for tanks used in storing low boiling temperature liquids, wherein the louvres will not be damaged or made inoperable by substantial temperature changes in the tank.

A still further object of this invention is to provide a novel tank structure for storing low boiling temperature liquids which is simple in construction, will have a long service life, and which may be economically manufactured.

Other objects and advantages of the invention will be evident from the following detailed description, when read in conjunction with the accompanying drawings which schematically illustrate my invention.

In the drawings:

FIGURE 9 is a plan view of a louvre which may be used in a tank having a circular horizontal cross section;

FIGURE 10 is a sectional view as taken along lines 10—10 of FIG. 9;

FIGURE 11 is a sectional view as taken along lines 11—11 of FIG. 9;

FIGURE 12 is a plan view of a louvre which may be used in a tank having a rectangular horizontal cross section; and FIGURE 13 is a sectional view as taken along lines 13—13 of FIG. 12.

Figure 1:
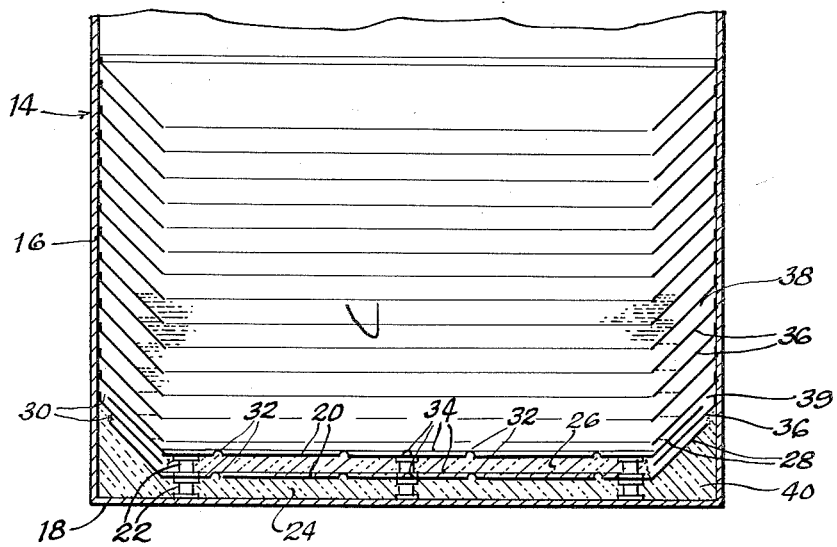
FIGURE 1 is a vertical sectional view through the lower portion of a tank constructed in accordance with this invention.

Refering to drawings in detail, and particularly FIG. 1, reference character 14 generally designates a tank body or shell having vertical walls 16 and a bottom wall 18 rigidly and sealingly secured to the lower ends of the vertical walls 16. The walls 16 and 18 may be of any desired construction, such as plate steel, providing the tank body 14 will be self-supporting and will not collapse or burst when substantially filled with a low boiling temperature liquid. The top (not shown) or the tank body 14 may be closed in any suitable manner, such as by a cover rigidly secured around the upper ends of the walls 16, with means for filling the tank body 14 with a cold liquid from the top of the bank body. The precise construction of the tank body 14 forms no part of this invention, except that the walls 16, the bottom 18, and the cover over the tops of the walls 16 must be formed out of a material which is impervious to gas and liquid, for purposes as will hereinafter be set forth.

In accordance with this invention, a pan 20 is supported on the bottom 18 of the tank body by suitable spaced supports 22 in such a manner as to provide a space 24 between the bottom of the pan 20 and the bottom wall 18. It is also preferred to support a second pan 20 on top of the lower pan 20 by additional supports 22, with a space 26 between the two pans 20. Each pan 20 is substantially flat, with the outer peripheral portion 28 thereof turned upwardly at an angle of less than 90° from the bottom 18 of the tank, such that each of the pans 20 may be used for containing a liquid. The configuration of each pan 20, in plan, should generally conform with the horizontal cross-sectional configuration of the tank body 14, with the outer periphery of each pan 20 being disposed in proximity with, but spaced from, the inner periphery of the tank walls 16. For example, when the tank body 14 is circular in horizontal cross section, each pan 20 will be circular with the outer diameter of the pan slightly less than the inner diameter of the tank body 14 to provide a clearance 30 between the outer edge of the pan and the inner periphery of the walls 16 of a size sufficient for a substantially free passage of gas between the pan and the walls 16.

Figure 2:
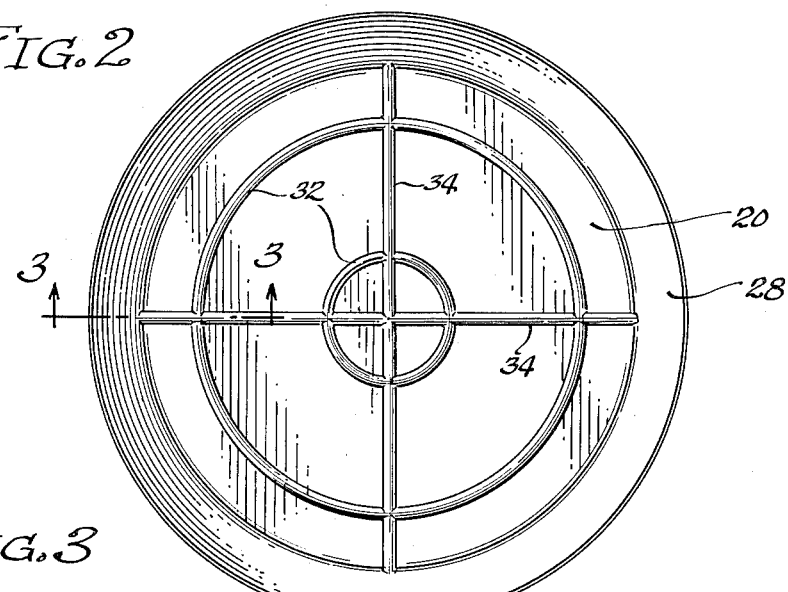
FIGURE 2 is a plan view of one of the pans used in the lower end portion of the tank illustrated in FIG. 1.
Figure 3:
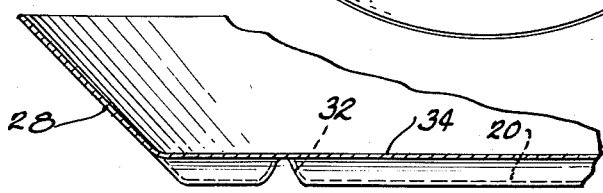
FIGURE 3 is a sectional view as taken along lines 3—3 of FIG. 2.

It is also preferred that the bottom portion of each pan 20 be provided with circumferentially extending corrugations 32 and radially extending corrugations 34, as illustrated in FIGS. 1, 2, and 3. When the pans 20 are formed out of metal, such as stainless steel or aluminum, the corrugations 32 and 34 may be easily formed by crimping the metal. At least two of the circumferential corrugations 32 are preferably provided in concentric relation, such that any radial movement of portions of the respective pan caused by contraction or expansion of the material in a radial direction will not substantially displace the outer edge portions of the respective pan, to minimize the possibility of damaging the pan as, for example, by contacting the vertical walls 16 of the tank 14. The radially extending corrugations 34 accommodate contraction or expansion of the pans in a circumferential direction and prevent possible damage to the pans. Although I have shown the corrugations 32 and 34 as being provided only in the central, substantially flat, portion of each pan 20, it will be understood that the radially extending corrugations 34 may be extended on outwardly through the slanted or upturned portions 28 of the pans, and another circumferential corrugation 32 may be formed in the upturned portion 28 of each pan, if desired. Finally, it should be noted that each of the pans 20 is constructed out of a material which will withstand the substantial temperature variations encountered and which is impervious to gas and liquid, such that either of the pans 20 may be used to contain the cold liquid stored in the tank body 14. Thus, the pans 20 may be formed out of any suitable metal or plastic, for example, which may be shaped to the desired configuration.

A plurality of louvres 36 are secured around the inner periphery of the tank body 14 in vertically spaced relation. Each louvre 36 is formed out of a material which is either gas impervious, such as metal or plastic, or has a limited gas permeability, such as wood, and extends downwardly and inwardly from the inner periphery of the tank body 14. Also, the lower inner periphery of each louvre 36 extends below the upper outer periphery of the next lower louvre to provide a plurality of overlapping gas pockets 38 extending around the inner periphery of the body 14. The outer edge of each louvre 36 is secured to the inner periphery of the tank body 14 with a sufficiently gas-tight connection that gas will enter each pocket 38 at a faster rate than it will escape through the louvres 36 forming the pocket and along the inner periphery of the body 14 around the outer edges of the respective louvres. I prefer to cement or otherwise seal the outer edges of the louvres 36 to the inner periphery of the tank body 14 and assure that no gas will escape around the outer edges of the louvres, although, as noted above, it is only necessary to control the rate of gas flow into and out of the pockets 38 to retain a back pressure on liquid extending into the pockets, as will be more fully hereinafter set forth.

The angle at which the louvres 36 are extended may be varied as desired, but it is preferred that the louvres 36 be extended about parallel with the outer peripheral portions 28 of the pans 20. One of the louvres 36 is positioned between the peripheral portions 28 of the pans 20, and each of the louvres 36 secured in the tank body directly above the respective pan 20 is of a length to extend downwardly into the respective pan in overlapping relation with the peripheral portion 28 of the respective pan to form gas pockets 39 extending around the edges of the pans and downwardly into the pans.

When the tank body 14 is filled with a liquid having a low boiling temperature, such as liquefied natural gas which has a boiling temperature of between —240° and —258° F., the liquid will rest on the upper pan 20 and the liquid will tend to rise between the outer peripheral portion 28 of the upper pan and the louvre 36 extending downwardly into the pan. However, gas in the tank body 14 before the tank is filled, and gas boiling from the cold liquid will be trapped in the space 39 extending from underneath the respective louvre 36 downwardly around the outer edge of the upper pan 20 and then on downwardly into the lower pan 20 and into the bottom portion of the tank body 14 below the lower pan 20, to exert a back pressure on the liquid extending from the louvre 36 extending into the outer peripheral portion 28 of the upper pan 20. The back pressure exerted by this trapped gas will retain the depth of the liquid in the outer peripheral portion 28 of the upper pan 20 to below the upper edge of this portion 28 and prevent the cold liquid from overflowing the upper pan 20. It will be noted, however, that when two of the pans 20 are provided in vertically spaced relation and a louvre 36 extends between the two pans, any liquid which may inadvertently overflow the upper pan 20 will be trapped in the lower pan 20, with the liquid level in the lower pan being controlled by the respective louvre 36 in the same manner as previously described in connection with the upper pan 20.

This invention also contemplates the use of a porous insulation material 40 in the space 24 below and around the lower pan 20, as well as in the space 26 between the two pans 20. The porous insulation 40, and particularly that portion of the insulation disposed in the space 24 in contact with the outer walls of the body 14, also provides a barrier against the flow of the cold liquid. The side walls 16 and the bottom 18 will obviously be at a higher temperature than the cold liquid in the tank. Therefore, any liquid splashing over the pans 20 will enter the porous insulation 40 and a portion of the liquid will be immediately evaporated, such that the gas will tend to migrate toward the inner surfaces of the side walls 16 and the bottom 18. This gas will become trapped in the pores of the outer portions of the insulation and provide a gas barrier to stop the outward flow of the liquid toward the walls 16 and the bottom 18 and a further evaporation of the liquid. The porous insulation 40 may be, for example, cork, light-weight silica aerogel such as that manufactured by Monsanto Chemical Company under the trademark Santocel, exfoliated vermiculite, bloated clay, diatomaceous earth, or glass wool. It is to be understood, however, that a tank may be constructed without the use of the insulation 40 and the tank body will be protected and evaporation of the liquid in the tank will be held to a minimum, unless the tank is subjected to movements which will cause a splashing of the liquid over the outer edges of the pans 20. The insulation 40 is very useful when such splashing is encountered.

As the liquid level in the tank body 14 is increased, the cold liquid will tend to rise between the various louvres 36. However, gas boiling off of the liquid and migrating vertically from one pocket to another will be sufficiently trapped in the pockets 38 underneath each louvre 36 to exert a back pressure on the liquid extending underneath the respective louvre 36, such that the liquid will be retained out of contact with the tank walls 16, as previously indicated.

Figure 4:
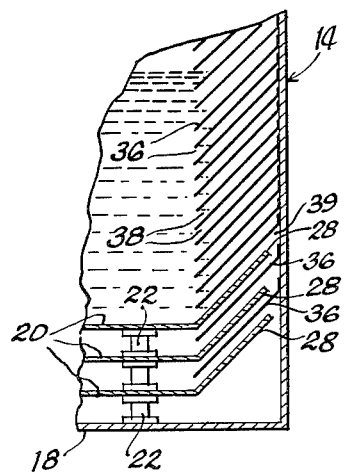
FIGURE 4 is a detailed sectional view of one of the lower corners of a tank structure illustrating a modification of the pan and louvre construction.

FIGURE 4 illustrates a tank construction wherein an overflow of the cold liquid over the outer edge of the upper pan 20, as well as an outward flow of the cold liquid into contact with the inner periphery of the tank walls 16 at any height throughout the tank, is prohibited by a plurality of gas pockets. In this embodiment, the louvres 36 are disposed closer together than illustrated in FIG. 1, such that each louvre 36 overlaps at least the next three lower louvres. In other words, the lower inner edge or periphery of each louvre 36 extends below the upper outer edge or periphery of the next three lower louvres, such that outward flow of the liquid is prevented by three concentric gas pockets 38 at any level in the tank body 14. Therefore, if any one of the louvres 36 were to collapse or become fractured, or if any two adjacent louvres 36 were to become inoperable, the liquid would still be retained in spaced relation from the inner periphery of the tank walls 16 by at least one gas pocket 38.

It will also be observed in FIG. 4 that three of the louvres 36 extend downwardly into the upper pan 20. Therefore, the liquid level in the outer peripheral portion of the upper pan 20 is actually limited by three separate gas pockets. In other words, when all of the louvres 36 extending into the upper pan 20 are in operating position and condition, the liquid level in the outer peripheral portion of the upper pan 20 will be limited by the gas pocket 39 extending around the outer edge of the upper pan 20 and downwardly between the peripheral portion 28 of the respective pan and the adjacent louvre 36. However, if the louvre 36 nearest to the portion 28 of the upper pan 20 were to become inoperable, the liquid level in the outer peripheral portion of the respective pan would still be limited by the next upper louvre 36 to prevent an overflow of liquid over the outer edge of the upper pan. Likewise, the third louvre 36 (counting upwardly from the pan 20) would prevent an overflow of liquid from the pan in the event the next two lower louvres 36 became inoperable. FIGURE 4 further illustrates the use of three vertically spaced pans 20 in the lower portion of a tank structure to further insure that the cold liquid will not come into direct contact either with the vertical walls 16 or the bottom wall 18.

Figure 5:
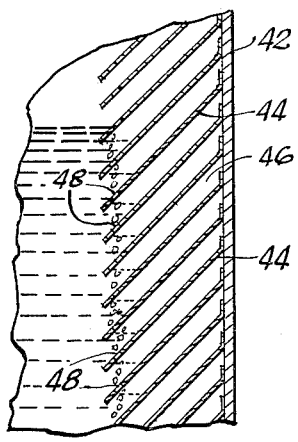
FIGURE 5 is a vertical sectional view through a portion of one side of a tank illustrating a modified louvre construction, wherein gas trapped in a lower gas pocket may be passed upwardly to an upper gas pocket upon an increase in pressure in the lower pocket.

FIGURE 5, as previously indicated, illustrates a louvre construction wherein the gas pressure in a series of gas pockets preventing contact of cold liquid with the wall of a tank may be distributed vertically along the tank. In this figure, reference character 42 designates a vertically extending tank wall having a plurality of vertically spaced louvres 44 secured around the inner periphery thereof and extending downwardly and inwardly, much in the same manner as the louvres 36 in FIG. 1. Each louvre 44 overlaps the adjacent lower louvre 44 to form a gas pocket 46 between each two louvres which prevents an outward flow of cold liquid in the tank from coming into contact with the wall 42. In this embodiment, at least one aperture 48, and preferably a plurality of circumferentially spaced apertures 48, is formed in each louvre 44 adjacent the inner periphery thereof. Each aperture 48 is arranged underneath a portion of the next upper louvre 44. Therefore, when an excess of gas is received by any one of the pockets 46, the excess gas may bubble upwardly through the respective aperture 48 and the bubbled gas will rise into the next upper pocket 46. Therefore, an excessive back pressure created in any one of the pockets 46 will be transmitted to the upper pockets 46 to assure that sufficient gas is available in the upper pockets 46 to prevent the liquid from coming into direct contact with the wall 42.

Figure 6:
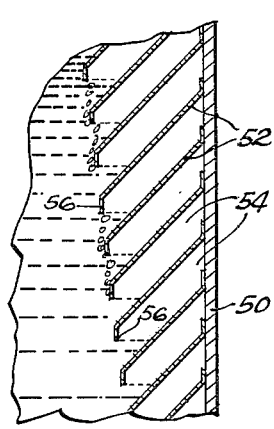
FIGURE 6 is a view similar to FIG. 5 illustrating another modified louvre construction for distributing gas pressure from a lower to a higher gas pocket.

FIGURE 6 illustrates another embodiment which provides a distribution of gas upwardly through a series of gas pockets surrounding a cold liquid. In this figure, reference character 50 designates a vertical wall of a tank structure having a plurality of vertically spaced louvres 52 extending around the inner periphery of the wall 50. Each louvre 52 provides a pocket 54 in the same manner as previously described to prevent the outward flow of cold liquid into contact with the inner periphery of the tank wall 50. In this embodiment of the invention, each louvre 52 extends inwardly from the inner periphery of the tank wall 50 a greater distance than the next lower louvre 52. Therefore, any excess gas trapped in any one of the pockets 54 and bubbling underneath the inner edge of the louvre 52 forming the top of the pocket will bubble upwardly into the next upper pocket 54 and supplement the supply of gas in this next upper pocket. Thus, any gas boiling from the cold liquid in a tank may be trapped and utilized to retain the liquid out of direct contact with the inner periphery of the tank wall. FIG. 6 also illustrates that the inner peripheral portion 56 of each louvre 52 may be flanged or turned downwardly to strengthen the respective louvre 52, without affecting the operation or use of the respective louvre.

Figure 7:
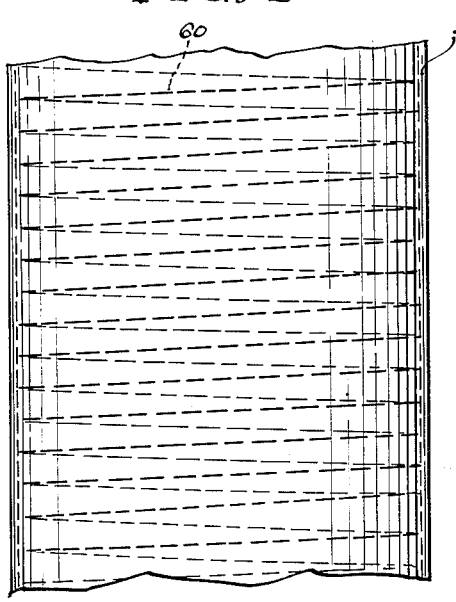
FIGURE 7 is a schematic elevational view of a portion of a tank illustrating, by the dashed lines, the path along which a louvre may be secured around the inner periphery of a tank to provide a distribution of gas pressure in the gas barrier surrounding liquid stored in the tank.
Figure 8:
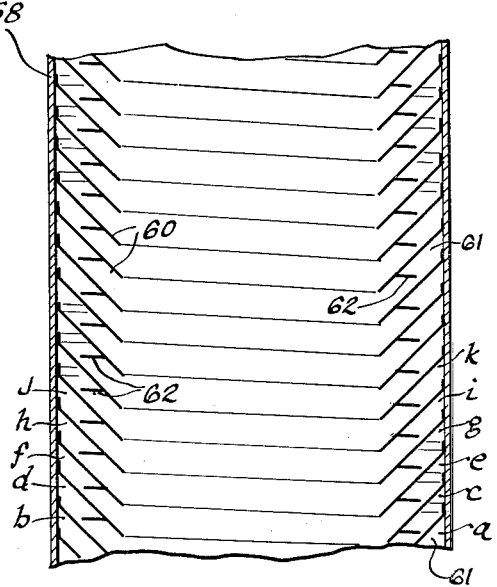
FIGURE 8 is a vertical sectional view through the tank illustrated schematically in FIG. 7.

FIGURES 7 and 8, as previously indicated, illustrate a tank and louvre construction providing a path for gas around a body of cold liquid retained in a tank, with FIG. 7 being a schematic elevational view of the tank structure and FIG. 8 being a vertical sectional view of the tank structure. In these two figures, reference character 58 designates the vertical walls of a tank and reference character 60 designates a louvre extending around the inner periphery of the tank walls 58 a plurality of times. As illustrated most clearly in FIG. 7 by the dashed lines, the louvre 60 is secured around the inner periphery of the tank wall 58 in a spiral configuration. The louvre 60 is extended downwardly and inwardly from the inner periphery of the tank walls 58, and the turns of the louvre 60 around the tank wall 58 are spaced apart a sufficiently small distance that the louvre 60 in each turn overlaps the portion of the louvre 60 in the adjacent lower turn to provide a spirally extending gas pocket 61 around the inner periphery of the tank walls 58. In other words, each turn of the louvre 60 around the inner periphery of the tank walls 58 forms a gas pocket extending 360 degrees around the inner periphery of the tank in a spiral configuration, as from *a* to *b* to *c*, as illustrated in FIG. 8. This gas pocket 61 will extend continuously around the inner periphery of the tank as indicated by the sequence of small letters in FIG. 8. In this embodiment, therefore, an excess of gas trapped in any portion of the spiral gas pocket 61 will be distributed throughout the length of the pocket and provide a substantially uniform back pressure in the gas barrier surrounding a body of cold liquid in the tank and insure that the liquid will not come into direct contact with the inner periphery of the vertical walls 58. The upper end (not shown) of this gas pocket may be closed off or may communicate with the space normally provided above the level of the cold liquid in the tank. In this last instance, the vapor pressure in the upper end portion of the tank may be transmitted downwardly around the body of liquid and form an effective barrier against outward movement of the cold liquid.

In the construction illustrated in FIG. 8, I prefer to secure a baffle plate 62 around the medial portion of each turn of the louvre 60, with the outer edge of each turn of the baffle plate 62 extending into close proximity with the outer surface of the next lower turn of the louvre 60. The baffle plate 62 restricts communication between the level of the cold liquid and the spirally extending gas pocket at each turn of the pocket, and is particularly useful when a tank using a spirally extending louvre is subjected to movement, to minimize splashing of the cold liquid into the spirally extending gas pocket and against the side walls of the tank.

FIGS. 9 through 13 illustrate louvre constructions which will accommodate expansion and contraction of a louvre caused by the wide range temperature changes in a tank storing a low boiling temperature liquid, such that a louvre may be constructed out of a relatively cheap material having a relatively high coefficient of expansion. The louvre 64 shown in the plan view in FIG. 9 has a configuration for use of the louvre in a tank body having a circular horizontal cross section. In this louvre construction, a plurality of radially extending corrugations 66 are formed in circumferentially spaced relation around the louvre. As illustrated in FIGS. 10 and 11, each corrugation 66 extends from the inner periphery of the louvre to the upturned flange portion 68 of the louvre which is used for securing the louvre along the inner periphery of a tank wall. The upturned flange portion 68 of the louvre will normally be at about the same temperature as the wall of the tank and will not be subjected to substantial temperature changes. Therefore, the corrugations 66 extending only through the slanted portions of the louvre will accommodate any expansion and contraction to which the louvre is normally subjected.

It is also preferred that each corrugation 66 be larger near the inner periphery of the louvre and progressively decrease in size toward the outer periphery of the louvre. It will be apparent that the corrugation may be varied in size either by changing the width of the corrugation or by changing the height of the corrugation, as illustrated in FIG. 11. With this construction, each louvre 64 may be formed out of a substantially rectangularly shaped flat plate of metal, with the ends of the plate being welded together and the corrugations 66 formed of progressively increasing size toward the inner periphery of the louvre to position the angle at which the louvre extends from the upturned flanged portion 68.

The louvre 70 illustrated in FIG. 12 is formed for use in a tank body having a rectangular horizontal cross section. The outer edge portion 72 of the louvre 70 is turned upwardly for connection with the inner periphery of the tank walls, and the main body portion of the louvre is extended downwardly and inwardly at the desired angle, as illustrated by the louvres 36 in FIG. 1. To accommodate expansion and contraction of the louvre 70, I provide a corrugation 74 in each corner of the louvre extending radially with respect to the tank structure. Each corrugation 74, as illustrated in FIG. 13, extends from the inner edge of the louvre 70 to the upturned flange portion 72, since the upturned flange portion 72 will not normally be subjected to substantial temperature changes. I also prefer to provide one or more corrugations 76 in the medial portion of the louvre 70 between each pair of corrugations 74 to further assure that the louvre 70 will not be damaged or become inoperable, as by collapsing or becoming ruptured, through expansion and contraction.

In each of the louvre constructions disclosed herein, it is preferred that the louvres be formed out of an extremely thin metal so that they can be made of brittle steel and yet stay within the limits of the brittle properties of the steel. Such thin louvres will have a relatively low coefficient of heat transfer to minimize the transfer of heat from the vertical tank walls into the cold liquid being stored, are cheaper than stainless steel or aluminum, and such louvres will be light in weight to provide an economical construction. It will be understood, however, that the louvres may be formed out of any other suitable material, and particularly aluminum, stainless steel, wood, or plastics, although those louvres illustrated in FIGS. 9 through 13, as previously indicated, may be formed out of a cheaper metal, such as plate steel, since contraction and expansion thereof may be accommodated by the corrugation construction.

From the foregoing, it will be apparent that the present invention provides a novel tank construction for storing low boiling temperature liquids, such as liquefied natural gas, with the use of a minimum or no insulation. The pans in the lower end portion of a tank, in combination with the lowermost louvres, will effectively prevent the cold liquid from coming into direct contact with the warm tank walls or tank bottom to prevent fracture of the tank and minimize evaporation of the liquid in the lower portion of the tank. The upper louvres will prevent the liquid from coming into direct contact with the vertical tank walls by the formation of at least one, and preferably a plurality of concentric gas pockets around the body of liquid. When a plurality of gas pockets are provided, louvre failures will not ordinarily destroy the gas barrier surrounding the body of cold liquid. It will also be apparent that the present invention provides a louvre construction which will accommodate expansion and contraction of the louvre and facilitate the use of cheaper materials of construction. It will further be apparent that the present invention provides a series of superimposed gas-tight pockets surrounding a body of cold liquid in a tank, as well as a continuous gas pocket, such that pressure in the gas barrier may be distributed to provide a more effective insulation and prevent the liquid from coming into contact with the inner periphery of the tank walls.

Changes may be made in the combination and arrangement of parts or elements as heretofore set forth in the specification and shown in the drawings, it being understood that changes may be made in the precise embodiments disclosed without departing from the spirit and scope of the invention as defined in the following claims.

I claim:

1. In a tank for storing liquefied gas having a boiling point far below ambient temperature, a body having side walls and a bottom impervious to gas and liquid, a pan supported on the lower portion of the tank body in upwardly spaced relation from the bottom of the tank body, the outer peripheral portion of the pan being turned upwardly and outwardly at an angle less than 90° from the bottom of the tank body to hold liquid in the pan, and a louvre secured around the inner periphery of the tank body above the pan and extending inwardly and downwardly into the outer peripheral portion of the pan and in about parallel relationship therewith to overlap the upturned outer peripheral portion of the pan to form a gas pocket extending into the outer peripheral portion of the pan from which vapors are incapable of escape at a rate greater than the introduction of vapors from the liquid to build up back pressure which prevents the rise of liquid beyond the edge of the pan thereby to prevent liquid from flowing over the edges of the pan.

2. A tank as defined in claim 1 characterized further in that said louvre has a plurality of circumferentially spaced and radially extending corrugations therein to accomodate expansion and contraction of the louvre.

3. A tank as defined in claim 2 characterized further in that each of said corrugations progressively decreases in size from the inner toward the outer periphery of the louvre.

4. A tank as defined in claim 1 characterized further in that said tank body is rectangular in horizontal cross section, and a corrugation is provided in said louvre at each corner of the tank body.

5. In a tank for storing liquefied gas having a boiling point far below ambient temperature, a body having side walls and a bottom impervious to gas and liquid, a plurality of pans supported in vertically spaced relation in the lower portion of the tank body, with the lower pan supported in upwardly spaced relation from the bottom of the tank body, the outer peripheral portion of each pan being extended upwardly for retaining liquid in the respective pan, and a louvre secured around the inner periphery of the tank body above each pan and extending downwardly and inwardly into the outer peripheral portion of the respective pan to overlap the upwardly extending outer peripheral portion of the pans to form a gas pocket from which vapor is incapable of escape at a rate greater than the introduction of vapors therein to build up back pressure which prevents the rise of liquid beyond the edge of the pans and which limits the depth of liquid in the outer peripheral portion of the respective pan.

6. A tank as defined in claim 5 characterized further in that the outer peripheral portion of each pan is extended upwardly and outwardly at an angle of less than 90° with respect to the bottom of the tank body, and each louvre is extended about parallel with the outer peripheral portion of the respective pan.

7. In a tank for storing a liquefied gas having a boiling point far below ambient temperature, a tank body impervious to gas and liquid, a plurality of louvres secured around the inner periphery of the tank body in vertically spaced relation, each of said louvres being extended downwardly and inwardly from the inner periphery of the tank body to form a gas pocket thereunder, and said louvres being of such lengths and spaced apart that each louvre overlaps at least the next two lower louvres to provide at least two concentric gas pockets between liquid stored in the tank and the inner periphery of the tank at any particular level.

8. In a tank for storing a liquefied gas having a boiling point far below ambient temperature, a tank body imperviuos to gas and liquid, a plurality of louvres secured around the inner periphery of the tank body in vertically spaced relation, each of said louvres being extended downwardly and inwardly from the inner periphery of the tank body to form a gas pocket thereunder, the lower inner end of each louvre being extended below the upper outer end of the next lower louvre to provide at least one gas pocket between liquid stored in the tank and the inner periphery of the tank body at any particular level, and each of said louvres having a plurality of radially extending and circumferentially spaced corrugations therein to accommodate expansion and contraction of the louvres.

9. A tank as defined in claim 8 characterized further in that said tank body is circular in horizontal cross section and each of said corrugations progressively decreases in size from the inner toward the outer periphery of the respective louvre.

10. A tank as defined in claim 8 characterized further in that said tank body is rectangular in horizontal cross section, and each louvre has a radially extending corrugation therein at each corner of the tank body.

11. In a tank for storing a liquefied gas having a boiling point far below ambient temperature, a tank body impervious to gas and liquid, a plurality of louvres secured around the inner periphery of the tank body in vertically spaced relation, each of said louvres being extended downwardly and inwardly from the inner periphery of the tank body to form a gas pocket thereunder, the lower inner end of each louvre being extended below the upper outer end of the next lower louvre to provide at least one gas pocket between liquid stored in the tank and the inner periphery of the tank body at any particular level, and each of said louvres having at least one aperture therein near the lower inner end thereof arranged to pass gas from the gas pocket under the respective louvre to the gas pocket under the next upper louvre.

12. In a tank for storing a liquefied gas having a boiling point far below ambient temperature, a tank body impervious to gas and liquid, a plurality of louvres secured around the inner periphery of the tank body in vertically spaced relation, each of said louvres being extended downwardly and inwardly from the inner periphery of the tank body to form a gas pocket thereunder, the lower inner end of each louvre being extended below the upper outer end of the next lower louvre to provide at least one gas pocket between liquid stored in the tank and the inner periphery of the tank body at any particular level, and each of said louvres being extended inwardly into the tank a greater distance than the next lower louvre to trap gas escaping around the inner periphery of the next lower louvre.

13. In a tank for storing a liquefied gas having a boiling point far below ambient temperature, a tank body impervious to gas and liquid, a louvre extending around the inner periphery of the tank body a plurality of times in a spiral path, the outer periphery of said louvre being connected to the inner periphery of the tank body and said louvre being extended downwardly and inwardly from the inner periphery of the tank body to form a spirally extending gas pocket under the louvre, and the inner periphery of each turn of the louvre being extended below the outer periphery of the next lower turn of the louvre to provide an overlapping of the turns of the spirally extending gas pocket and prevent contact between liquid in the tank and the inner periphery of the tank body.

14. A tank as defined in claim 13 characterized further to include a baffle encircling a medial portion of each turn of the louvre and extending into proximity with the inner surface of the next lower turn of the louvre to restrict communication between liquid in the tank and the upper portion of the respective turn of the gas pocket.

15. In a tank for storing liquefied gas having a boiling point far below ambient temperature, a tank body having side walls and a bottom impervious to gas and liquid, a pan supported in the lower portion of the tank body in upwardly spaced relation from the bottom of the tank, the outer peripheral portion of the pan being turned upwardly to hold liquid in the pan, and a louvre secured around the inner periphery of the tank body above the pan and extending inwardly and downwardly into the outer peripheral portion of the pan to overlap the upturned outer peripheral portion of the pan to form a gas pocket extending into the outer peripheral portion of the pan from which vapor is incapable of escape at a rate greater than the introduction of vapors from the liquid to build up back pressure which prevents the rise of liquid beyond the edge of the pan thereby to prevent liquid from flowing over the edges of the pan, said pan having a plurality of radially extending corrugations therein and at least one circumferentially extending corrugation therein to accommodate expansion and contraction of the pan.

16. In a tank for storing liquefied gas having a boiling point far below ambient temperature, a tank body having side walls and a bottom impervious to gas and liquid, a pan supported in the lower portion of the tank body in upwardly spaced relation from the bottom of the tank, the outer peripheral portion of the pan being turned upwardly to hold liquid in the pan, and at least two louvres secured around the inner periphery of the tank body above the pan in vertically spaced relation with each of said louvres being of a length to extend into the outer peripheral portion of said pan to overlap the upturned outer peripheral portion of the pan to form gas pockets extending into the outer peripheral portion of the pan from which vapors are incapable of escape at a rate greater than the introduction from the liquid to build up back pressure which prevents the rise of liquid beyond the edge of the pan thereby to prevent liquid from flowing over the edges of the pan.

17. In a tank for storing liquefied gas having a boiling point far below ambient temperature, a tank body having side walls and a bottom impervious to gas and liquid, a pan supported in the lower portion of the tank body in upwardly spaced relation from the bottom of the tank, the outer peripheral portion of the tank being turned upwardly to hold liquid in the pan, a louvre secured around the inner periphery of the tank body above the pan and extending inwardly and downwardly into the outer peripheral portion of the pan to overlap the upturned outer peripheral portion of the pan to form a gas pocket extending into the outer peripheral portion of the pan from which vapors are incapable of escape at a rate greater than the introduction of vapors from the liquid to build up back pressure which prevents the rise of liquid above the edge of the pan thereby to prevent liquid from flowing over the edges of the pan, and porous insulation between said pan and the bottom of the tank body.

References Cited in the file of this patent

UNITED STATES PATENTS

| | | |
|---|---|---|
| 1,420,802 | Wucherer et al. | June 27, 1922 |
| 2,177,369 | Lyon | Oct. 24, 1939 |
| 2,576,698 | Russum | Nov. 27, 1951 |
| 2,587,820 | Cartier | Mar. 4, 1952 |
| 2,676,773 | Sanz et al. | Apr. 27, 1954 |
| 2,859,895 | Beckwith | Nov. 11, 1958 |